United States Patent
Ward et al.

(10) Patent No.: US 10,535,323 B2
(45) Date of Patent: Jan. 14, 2020

(54) DISPLAY ZOOM CONTROLLED BY PROXIMITY DETECTION

(71) Applicant: Echostar UK Holdings Limited, Steeton (GB)

(72) Inventors: Martyn Ross Ward, West Yorkshire (GB); Antony Michael Dove, West Yorkshire (GB)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

(21) Appl. No.: 15/058,518

(22) Filed: Mar. 2, 2016

(65) Prior Publication Data

US 2016/0202871 A1 Jul. 14, 2016

Related U.S. Application Data

(63) Continuation of application No. 13/757,563, filed on Feb. 1, 2013, now Pat. No. 9,311,898.

(30) Foreign Application Priority Data

Feb. 3, 2012 (EP) .................................... 12153929

(51) Int. Cl.
*G09G 5/373* (2006.01)
*G06F 3/042* (2006.01)
*G06F 3/0488* (2013.01)

(52) U.S. Cl.
CPC ........... *G09G 5/373* (2013.01); *G06F 3/0421* (2013.01); *G06F 3/0488* (2013.01); *G06F 2203/04806* (2013.01)

(58) Field of Classification Search
CPC .................. G06F 3/0488; G06F 3/0421; G06F 2203/04806; G09G 5/373
See application file for complete search history.

(56) References Cited

U.S. PATENT DOCUMENTS 6,167,439 A * 12/2000 Levine .................. G06F 3/0483
358/408
6,904,570 B2 6/2005 Foote et al.
(Continued)

FOREIGN PATENT DOCUMENTS

WO 2006003586 A2 1/2006

OTHER PUBLICATIONS

European Patent Office, Extended European Search Report, dated Jun. 25, 2012 for European Patent Application No. 12 153 929.0.

*Primary Examiner* — Charles V Hicks
(74) *Attorney, Agent, or Firm* — Lorenz & Kopf LLP (57) ABSTRACT

Various embodiments provide a user device comprising a touch screen display having a touch screen input; a proximity detector arrangement comprising a plurality of sensors for detecting a location of an input device; and a control unit comprising a processor. The control unit is configured to receive data from the proximity detector to determine the location of the input device, including a value related to the distance of the input device to the display; and control the display to perform a zoom function to enlarge or reduce the size of content on a portion of the display based on the value related to the distance of the input device to the display. The proximity detector arrangement and control unit are configured to detect the location of the input device within a detection volume and to provide a gradual variation in enlargement or reduction of the size of content as the distance of the input device to the display varies. Providing a gradual variation in zoom allows for a more precise and enjoyable user experience.

16 Claims, 8 Drawing Sheets

(56) References Cited

U.S. PATENT DOCUMENTS

| | | |
|---|---|---|
| 7,109,978 B2 | 9/2006 | Gillespie et al. |
| 7,884,807 B2 | 2/2011 | Hovden et al. |
| 8,139,028 B2 | 3/2012 | Warren |
| 8,330,731 B2 | 12/2012 | Ausbeck, Jr. |
| 8,847,890 B2 | 9/2014 | Peterson et al. |
| 2008/0273755 A1 | 11/2008 | Hildreth |
| 2009/0225100 A1 | 9/2009 | Lee et al. |
| 2009/0237372 A1* | 9/2009 | Kim ................. G06F 3/044 345/173 |
| 2009/0278812 A1 | 11/2009 | Yasutake |
| 2010/0026723 A1 | 2/2010 | Nishihara et al. |
| 2010/0156807 A1 | 6/2010 | Stallings et al. |
| 2010/0328351 A1 | 12/2010 | Tan |
| 2011/0050629 A1* | 3/2011 | Homma ............ G06F 3/0414 345/174 |
| 2011/0164060 A1* | 7/2011 | Miyazawa ......... G06F 1/1643 345/660 |
| 2011/0193818 A1* | 8/2011 | Chen .................. G06F 3/041 345/174 |

* cited by examiner

DISPLAY ZOOM CONTROLLED BY PROXIMITY DETECTION

CROSS-REFERENCES TO RELATED APPLICATIONS

This application is a continuation of U.S. patent application Ser. No. 13/757,563, filed Feb. 1, 2013, which claims the benefit of European Application Ser. No. 12153929.0, filed Feb. 3, 2012.

FIELD OF THE INVENTION

The present invention relates to an apparatus and method for controlling zooming of a display, and particularly a touch screen display, by using proximity detection.

BACKGROUND OF THE INVENTION

User devices such as mobile communication devices often include touch sensitive input systems such as touch screens or touch displays. Touch screens are often formed as a resistive or capacitive film layer located on or adjacent to the display, which is used to sense contact of the screen by an object such as a user's finger, a stylus or a similar entity.

Touch screens often display a keypad or other content such as a webpage while simultaneously allowing the user to manipulate the content or properties of the display by touching the screen. For example, some devices with a touch screen allow the user to input information/data, in the form of text characters or numbers, via a virtual keyboard or other type of keypad displayed on the touch screen.

One issue that arises is that touch screens are found on a number of mobile devices and are therefore comparatively small. This results in keys of a keyboard or keypad being displayed relatively small and relatively close together.

One manner of overcoming these difficulties has been suggested in US patent application US2010/0026723. As well as a touch screen to detect input from an object on the surface thereof, the proximity of the user's finger is taken into account such that a graphical controller can magnify the visual content that is displayed on the touch screen at an approximate location beneath the finger. This is performed based on the user's finger breaking a grid of light beams located at a set distance away from the touch screen. When the grid is broken a graphical controller displays a zoomed portion of the display content beneath the user's finger on the touch screen. This allows characters on a keyboard beneath a user's finger to be enlarged as the user is moving to press a key.

Such methods/apparatus for controlling zoom based upon proximity to the screen suffer from being difficult or frustrating to use. It is an aim of the embodiments of the present invention to provide an improved method and apparatus for operating a touch screen device based on the proximity of the user's finger, or whatever object is used to provide input.

SUMMARY

The invention is defined in the claims, to which reference is now directed. Additional features of some implementations are set out in the dependent claims.

Various embodiments provide a user device comprising a touch screen display having a touch screen input; a proximity detector arrangement comprising a plurality of sensors for detecting a location of an input device; and a control unit comprising a processor. The control unit is configured, by running appropriate software, to receive data from the proximity detector to determine the location of the input device, including a value related to the distance of the input device to the display; and control the display to perform a zoom function to enlarge or reduce the size of content on a portion of the display based on the value related to the distance of the input device to the display. The proximity detector arrangement and control unit are configured to detect the location of the input device within a detection volume and to provide a gradual variation in enlargement or reduction of the size of content as the distance of the input device to the display varies. Providing a gradual variation in zoom allows for a more precise and enjoyable user experience.

The control unit may be configured to wait for a predetermined time period between detecting a change in position of the input device within the detection volume and performing the zoom function. Waiting for a predetermined period of time before taking zooming action helps to avoid unwanted zooming due to unintended movements of the user input device. Preferably the control unit is further configured to calculate the average position of the input device during the predetermined time period, the processor being further configured to ignore movements of the input device within a predetermined distance of the calculated average position such that they have no effect on the zoom function. Avoiding zooming when the input device does not move far from the average position again helps to avoid unwanted zoom function, and compensates for jitter of the input device.

The control unit is preferably configured to wait for a predetermined time period between detecting the entrance of the input device into the detection volume and performing the zoom function. This allows the user sufficient time to avoid using the zoom function when only the touch screen functionality is required. In addition, such functionality avoids zooming when an input device unintentionally enters the input volume.

The detection volume preferably extends a predetermined first distance from the display, and preferably excludes a volume extending a second predetermined distance from the display, the first distance being greater than the second distance. Preferably the control unit is configured to ignore any measurements performed within the excluded volume. This allows an exclusion zone to be provided adjacent to the touch screen and/or proximity sensor, providing a zone in which the user input device can be located without activating the zoom function. Thus the user can use the touch screen repeatedly without activating the zoom unintentionally.

The touch screen input and the proximity detector arrangement may be the same components, such as a capacitive sensor. Alternatively, the touch screen display may be located on a first side of the user device and the proximity detector arrangement located on a different side of the user device, preferably being an opposite side to the user device. This allows the user to employ touch screen functionality and to separately employ proximity detection functionality by manipulating an input device in an input volume located on the opposite side of the device to the touch screen. In particular the user may grip the user device in one hand, and manipulate the touch screen with the other hand, whilst utilising the zoom functionality with a finger of the same hand being used to hold the device, this being particularly useful for mobile devices.

The control unit is preferably configured to enlarge the size of content on the screen from an initial size as the input device moves closer to the display, and to maintain the enlarged size as the input device subsequently moves further from the display, the control unit being further configured to resize the content to the initial size in response to a further input on the user device. Such a zoom regime allows the user to zoom the display with a first gesture, and maintain the zoom at the desired level without needing to retain the input device within the detection volume. The further input may be a button press, screen touch or re-entry of the input device into the detection volume for a predetermined period of time.

The control unit may be configured to commence detection of the distance of the input device at a first predetermined distance and to stop detection of the distance of the input device at a second predetermined distance, the first distance being different to the second distance and preferably being greater. An implementation with two thresholds, one for determining the active state and another for determining the inactive state allows for a smaller gesture from the user to exit the zoom functionality.

Preferably the plurality of sensors of the proximity detector arrangement are capacitive sensors. Using a capacitive proximity sensor allows the proximity detection arrangement and the touch screen to be integrated into the same arrangement using the same components.

The user device may be one of a mobile phone or smartphone, set top box, television, laptop, computer or tablet computer.

Various embodiments may further provide a method for controlling a zoom function on a user device, the user device comprising a touch screen display having a touch screen input and a proximity detector arrangement comprising a plurality of sensors for detecting a location of an input device. The method comprises receiving data from the proximity detector to determine the location of the input device within a detection volume, including a value related to the distance of the input device to the display; and controlling the display to perform a zoom function to enlarge or reduce the size of content on a portion of the display based on the value related to the distance of the input device to the display by gradually varying the enlargement or reduction of the size of content as the distance of the input device to the display varies.

Corresponding methods to implement the abovementioned preferable features of the user device may also be provided.

The method may be further include waiting for a predetermined time period between detecting a change in position of the input device within the detection volume and performing the zoom function. Preferably the method may further include calculating the average position of the input device during the predetermined time period and ignoring movements of the input device within a predetermined distance of the calculated average position such that they have no effect on the zoom function.

The method may further include waiting for a predetermined time period between detecting the entrance of the input device into the detection volume and performing the zoom function.

The method may further include ignoring any measurements performed within the excluded volume.

The method may include commencing detection of the distance of the input device at a first predetermined distance and stopping detection of the distance of the input device at a second predetermined distance, the first distance being different to the second distance and preferably being greater.

A computer program may also be provided for carrying out the methods above on a suitable device. In particular, the program may be executed on the processor of the control unit of the user device described above to cause it to undertake the method above or implement any of the features described above or below.

BRIEF DESCRIPTION OF THE DRAWINGS

Several examples will now be described in more detail with reference to the drawings in which.

DETAILED DESCRIPTION

Figure 1:
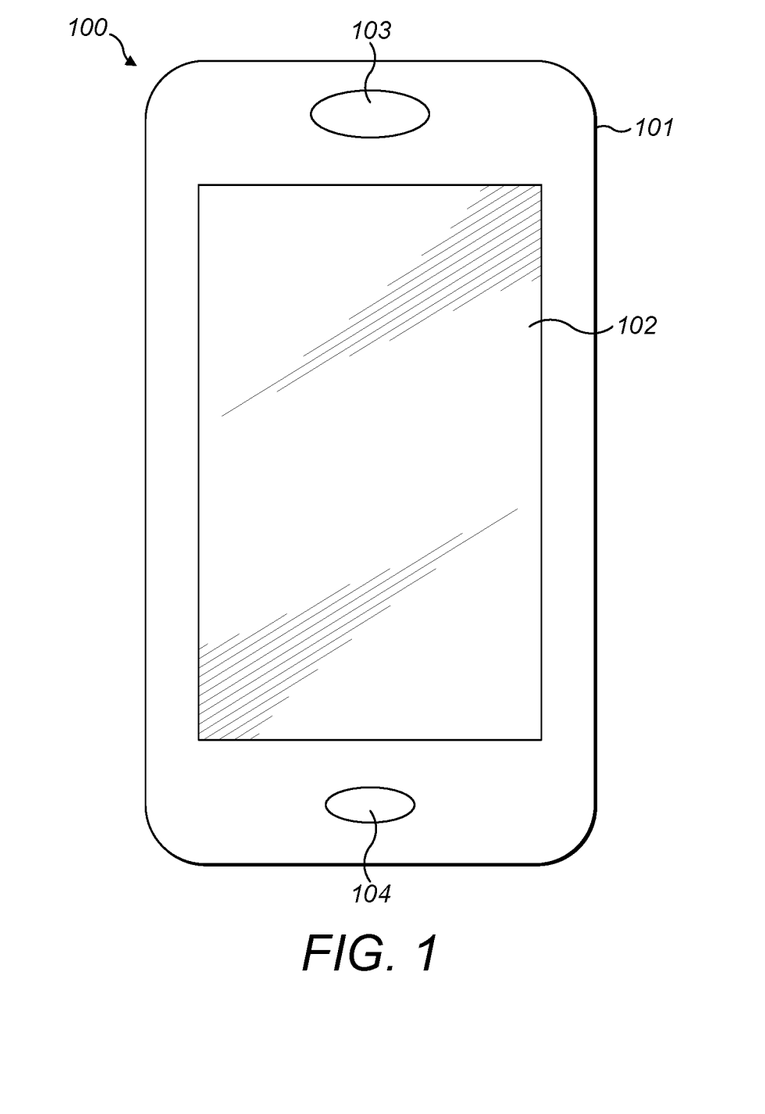
FIG. 1 shows an example of a touch screen device in the form of a smart phone.

FIG. 1 shows an example of a mobile phone, or smart phone, to which embodiments of the invention may be applied. The mobile phone 100 includes a housing or casing 101, a display 102, a speaker 103 and a microphone 104. A number of components, such as a receiver aerial and transmitter, are not shown.

The display 102 provides visual information to the user, such as text, images, video or any other type of graphics. The display, 102, also includes a touch screen configured to receive a user's input when the user touches the display. For example, the user may use their finger or a stylus to touch the display to provide input to the mobile phone and perform one or more operations. Touch screen functionality is utilised or activated by the user input device contacting the touch screen, or a protective layer on or adjacent to the touch screen.

Figure 2A:
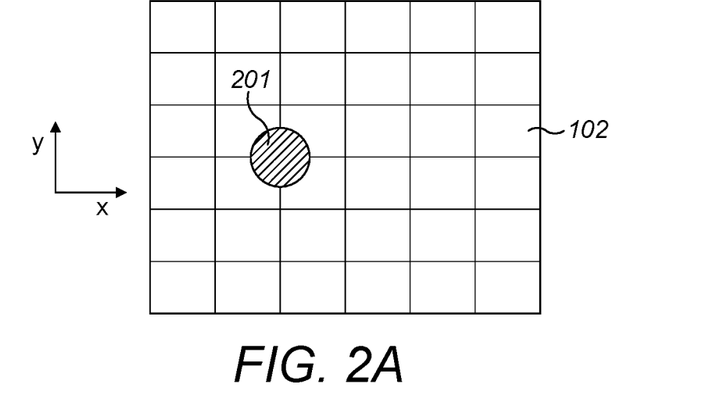
FIG. 2 shows a top down view A of the coordinate system of a touch screen in the plane of the screen and a side on view B of the same coordinate system of the screen.
Figure 2B:
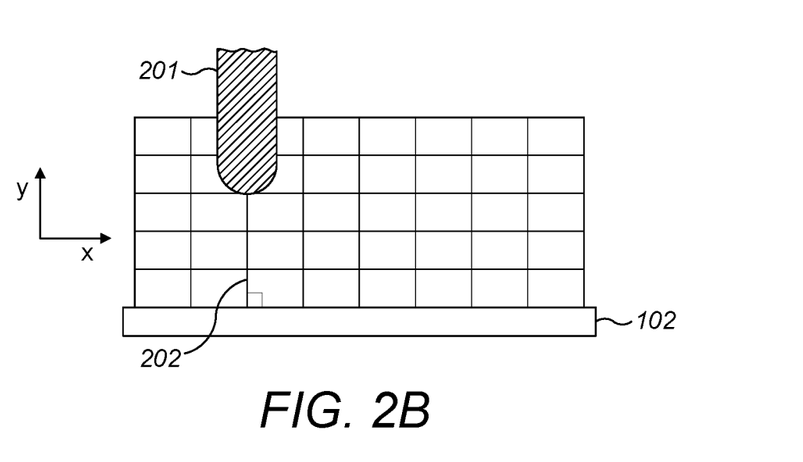

The user device 100, in addition to a touch screen, also includes a proximity detector arrangement capable of determining when an input object is at a certain distance from, but not in contact with, the touch screen 102. The proximity detector arrangement provides distance information as well as also providing coordinate information of the input object relative to the touch screen surface. This is highlighted in FIG. 2 which shows a top down view A of the coordinate system of the screen in the plane of the screen and a side on view B of the same coordinate system of the screen. The x,y coordinate system provides a location of the input device 201 in a plane parallel to the plane of the screen. The z coordinate provides the distance of the input device 201 relative to the screen, and particularly the distance along the normal line 202 to the screen at the location of the x,y coordinate. Without the user having to physically touch the screen the device is configured to determine an x,y coordinate and an indication of proximity to the screen.

The proximity detector arrangement may take different forms. It may, for example, be in the form of a plurality of transmission type photo-electric sensors, direct reflection type photoelectric sensors, mirror reflection type photo-electric sensors, high frequency oscillating proximity sensors, capacitive proximity sensors, magnetic proximity sensors, infrared proximity sensors, ultrasonic sensors and so on.

Figure 3A:
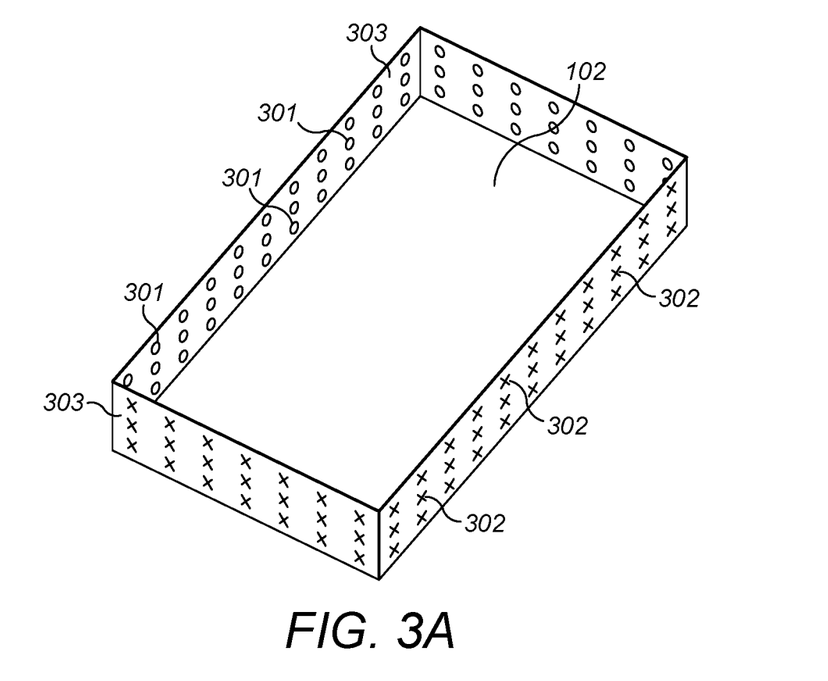
FIG. 3 shows a perspective view A of a proximity detection system for a touchscreen and a perspective view B of the grid produced by one plane of proximity detectors.
Figure 3B:
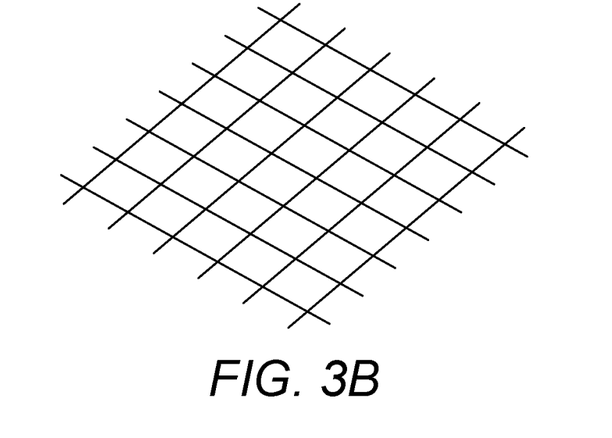

One example of a possible arrangement for the proximity detector arrangement is shown in FIG. 3. A plurality of infrared emitters 301 are provided around the perimeter of the touch screen 102, supported by perimeter sides 303. The height of the sides is exaggerated for illustrative purposes. Each infrared emitter 301 has a corresponding detector 302 on an opposing perimeter side. In diagram A of FIG. 3 the infrared emitters are each represented with a "dot", and the detectors each with a "cross". As can be seen in the figure, the emitters and receivers are arranged in particular planes. Each plane produces a grid of the type shown in diagram B. Each grid is at a different height, or proximity, relative to the touch screen 102. In FIG. 3 only three planes are shown, but more, or in certain embodiments fewer, could be used. As the user's finger approaches the touch screen the path between at least two emitter/detector pairs will be obscured by the finger. As a result, it can be determined where in the x,y coordinates parallel to the plane of the screen the finger is positioned. In addition, the plane in which the obscured emitter/detector pairs are located indicates proximity to the screen. Clearly multiple pairs in different planes may be obscured, with the data obtained from the plane closest to the screen being used to determine location data at least in the z axis perpendicular to the plane of the screen, but also preferably in the x,y plane parallel to the plane of the screen. Although infrared emitter/detector pairs are preferred, other types of light/EM radiation may be used provided they are sufficiently attenuated by the desired input object, such as a finger, to not pass through, or to be detectably attenuated on route, to the receiver on the other side.

In an alternative arrangement the proximity detector arrangement could be in the form of a capacitive touch screen. Capacitive touch screens use a plurality of capacitive sensors to determine the position of an input device relative to the screen. The capacitive sensors work by measuring changes in capacitance, which is determined by the area and proximity of a conductive object. Larger and closer objects cause greater current than smaller and more distant objects. The capacitance is also affected by the dielectric material in the gap between the objects. In typical capacitance sensing applications, the input device such as a user's finger, is one of the conductive objects; the target object, being the sensor plate on or adjacent to the screen, is the other. As is known in the art, there are many different variations of capacitive touch screens, including projected capacitive touch (PCT) technology in which an x,y grid is formed on a conductive layer either by etching one layer to form a grid pattern of electrodes, or by etching two separate perpendicular layers of conductive material with parallel lines or tracks to form the grid.

The primary difference between a capacitive touch sensor of the sort used in touch screens and a proximity sensor used in embodiments of the present invention is sensitivity. To construct a proximity sensor one can use the same basic design for a touch sensor and increase the sensitivity of the change in capacitance. Any change in capacitance is mainly due to a change in the distance between the input device and the target. The sensor electronics are configured to generate specific voltage changes for corresponding changes in capacitance. These voltages can be scaled to represent specific changes in distance of the input device. An example sensitivity setting, being the amount of voltage change for a given amount of distance change, may be approximately 1.0V/100 μm, whereby every 100 μm change in distance between the input device and the sensor/screen changes the output voltage by 1.0V. The capacitive change can also be used to detect the coordinate position of the input object in the plane of the capacitive touch sensor.

As the user's finger approaches the proximity sensor arrangement, the capacitance will start to rise before their hand touches the screen. A touch detection threshold can be set such that the detection circuit first triggers at a predetermined distance to the sensor to minimise false triggers. An implementation with two thresholds, one for determining the active state and another for determining the inactive state, may also be provided to take advantage of a hysteresis effect. At a first distance to the screen, as the input device is inserted into the detection volume initially, the control unit may commence detection, or ignore detections beyond the first distance. At a second distance to the screen, as the input device is removed from the detection volume after insertion, the control unit may stop detection, or start ignoring detections beyond the second distance. The first and second distances are different. The first distance is preferably greater than the second distance.

Using a capacitive proximity sensor allows the proximity detection arrangement and the touch screen to be integrated into the same arrangement using the same components. Proximity can therefore be used as an input to manipulate content on a display.

Figure 4:
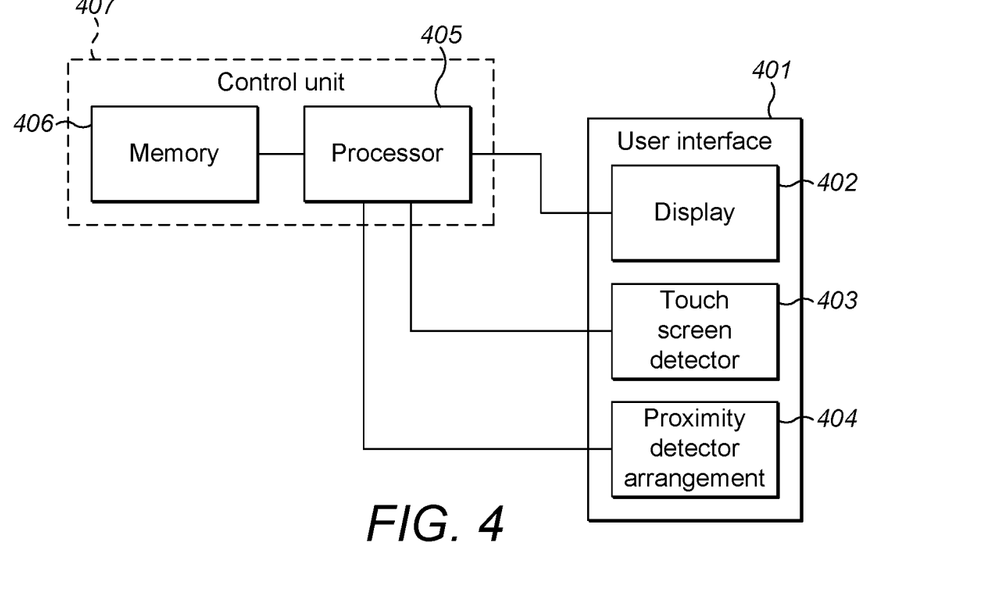
FIG. 4 shows a system incorporating a touch screen interface including a proximity detector and controller.

FIG. 4 shows an example of components in an overall system, such as the smart phone of FIG. 1. A user interface 401 is provided with which a user can provide input to the device, and receive data from the device. In particular, the user interface includes a display 402, a touch screen detector 403 of the sort described above, and a proximity detector arrangement 404 which, again, may be of the sort described above. The display and touch screen detector may be integrated together in the form of a touch screen. The proximity detector arrangement may also be part of the touch screen as described above. These components are connected to a processor 405 of control unit 407 which receives data from the touch screen detector and proximity detector arrangements to determine a position of a user input device such as a finger. As described above, that position is preferably a co-ordinate in a plane parallel to that of the display and a distance from the screen, being the distance from the input device along the line perpendicular to the plane of the screen to the screen surface. The processor may include a dedicated graphical processor or controller to control and manipulate the content displayed on the display screen. The graphical processor/controller may be provided separately to the main processor 405 or may be integral therewith. A memory 406 such as a RAM is also provided.

Figure 5:
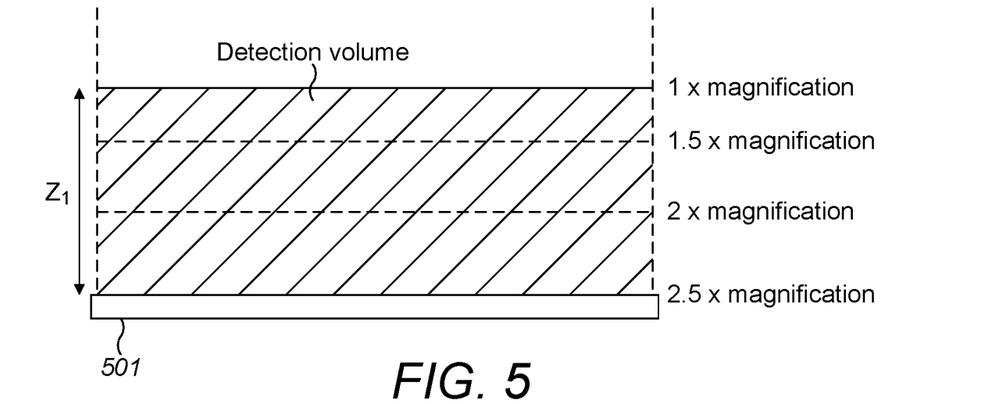
FIG. 5 shows a proximity detection volume used to control zooming of a display in relation to a touch screen.

Referring to FIG. 5, the proximity detection arrangement is used to control a zoom function. As the input device is brought into the activation region, indicated by line 502 at a perpendicular distance $Z_1$ from the screen 501, the proximity detection arrangement detects the input device and the processor calculates the x, y and z coordinates relative to the display. The control unit then controls the display to enlarge at least a portion of the display as a function of the distance of the input device to the display along the z direction perpendicular to the plane of the display.

The manner in which the enlargement may be displayed may be varied depending upon context, and this will be discussed in more detail below. In some embodiments of the invention, the enlargement of the portion of the display identified by the x,y coordinates may be progressively or continuously variable based on the proximity of the input device to the screen. In this manner, as the input device approaches the screen, the relevant portion of the display zooms or enlarges in a smooth manner, gradually increasing in size, or gradually increasing the zoom factor, as the input device nears the screen.

Providing a gradual zoom based on proximity of the input device to the screen can be achieved in different ways. The proximity detection arrangement may be configured to provide an indication of distance to the screen at predetermined distances, as would be the case for an arrangement of the sort shown in FIG. 3. Such an arrangement provides a series of gradations in distance, rather than a continuous measurement of proximity. A gradual increase in the amount of zoom dependent upon proximity can therefore be achieved in such arrangements by providing a sufficient number of planes of measurement along the z axis. The plurality of planes along the z axis may be any suitable number required to achieve a smooth zooming function.

Figure 6:
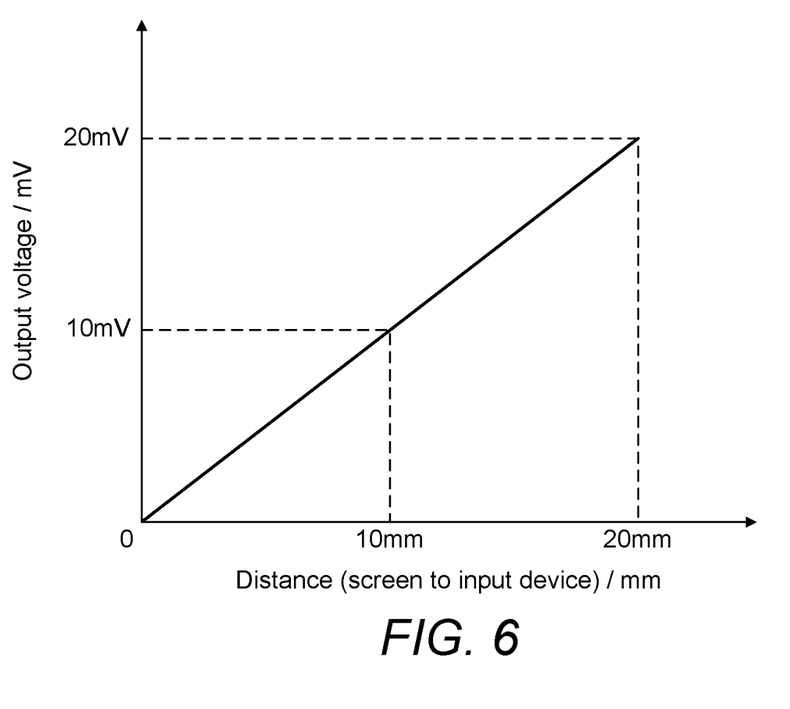
FIG. 6 shows an example of the relationship between distance between a capacitive sensor and an input device and the output voltage of a proximity detection arrangement incorporating a capacitive sensor.

More preferably, the proximity detection arrangement relies on sensors that provide a continuous, or substantially continuous, measurement of distance or proximity to the screen. Capacitive sensors of the sort described above, or ultrasonic sensors are suitable for such functionality. An example of the relationship between distance between the capacitive sensor and the input device and the output voltage of a proximity detection arrangement incorporating a capacitive sensor can be seen in FIG. 6. The example of FIG. 6, which is purely for illustrative purposes, shows a sensitivity of 1 mV per mm, and it can be seen from the figure that the relationship between distance and output voltage is linear. This can be used to convert the distance of the input device to the screen directly into a magnification of the relevant portion of the screen. For example, referring back to FIG. 5, the magnification may vary linearly with distance to the screen, culminating in a maximum magnification when the input device is in contact with the screen.

Although a capacitive proximity sensor may be used, any other type of sensor whose output varies based on distance from the input device to the sensor could be used. This could include an ultrasonic detector for example. The relationship between distance to the screen and the output of the sensor need not be linear necessarily, but this is preferred. Likewise, the relationship between the output of the sensor, such as the output voltage in the case of the capacitive proximity sensor, may not necessarily be a linear relationship. The magnification provided may take a different relationship such as an exponential relationship, with a magnification rate of change being greater at greater distances to improve the user experience.

One problem that can arise with the type of zoom control based on proximity detection described above is what will be described as "jitter". The output device is usually a user's finger, or a device such as a stylus that is held by the user. As a result, the input device is not held perfectly still and will move about in the x, y and z coordinates relative to the plane of the touch screen. An overly sensitive system will translate these into a variation of zoom, for movement along the z axis, or a change in the region of the screen to be magnified, for movement along the x or y axes. This could cause annoying continuous changes to the output on the display.

In order to avoid the effect of such jitter a form of user interface hysteresis can be used. A predetermined time delay is inserted by the controller/processor such that in response to a change in the x, y or z coordinate of the input device, no corresponding change is made to the display output until after a predetermined period of time. This predetermined period of time may be comparatively short, such as around 0.5 seconds or between 0.3 and 0.5 seconds.

The time delay introduced by the hysteresis may only be applied if the input device has stopped moving. That is, the input device has entered the proximity detection volume and traveled through a particular set of co-ordinates before effectively stopping there. This may correspond to a user enlarging a particular portion of a display and pausing to read that portion. Of course, the input device will be moving, to a certain extent, due to the jitter mentioned above. Therefore, where a user input device has substantially stopped, movements within a certain tolerance may be ignored by the control unit for the purposes of adjusting, or zooming the display. The tolerance in the movement may include movement in any of the x, y or z directions, and may be predetermined or variable depending upon user preference. For example, movements deviating from a measured co-ordinate by 0 to 5 mm may be discarded by the processor when determining the degree of zoom, or the region of the screen to be enlarged.

The tolerance in each dimension may differ, with a lower tolerance being used for the x and y co-ordinates and a larger tolerance for the z co-ordinates, or vice versa. This can accommodate for the fact that a user may be more likely to jitter in one particular direction or plane than another.

In addition to introducing hysteresis, the device may be configured to average the position of the input device. During the hysteresis period the average position of the input device may be calculated based on any detected change in coordinate. The resulting average position may be used as a reference, with any deviation from the average within a preselected tolerance distance in any direction being discarded by the processor and having no effect on the output of the display. Again as described above, the tolerances for each dimension/axis may vary.

The general arrangement described above uses the proximity of the input device to the screen to control a function applied to displayed content. In particular, proximity is input to the controller to control the level or degree of zoom/enlargement of a portion of the displayed content determined by the x,y coordinates of the input device relative to the place of the screen. However, the user may not always intend to implement the zoom functionality, but may instead wish to use touch screen functionality. For example, the user may simply wish to activate an icon or a link to a webpage by touching the relevant portion of the screen. Implementing the zoom during this action may be frustrating.

A time delay may be provided between the user input device entering the proximity detection volume shown in FIG. 5 and the zoom/enlargement functionality being activated. This activation delay would allow the user input device to move into contact with the screen (or the screen cover if one is used) to utilise the touch screen functionality without engaging the zoom proximity functionality. The time delay between the input device being detected within the proximity detection volume and activation of the proximity zoom functionality may be of the order of 1 second, 0.5 seconds or less. For example, the activation may occur after between 0.2-1 seconds, 0.3-0.6 seconds or 0.3-0.5 seconds. This parameter may be user adjustable.

Alternatively, the speed or rate of movement of the input device towards the screen may be used to determine whether to activate the proximity zoom functionality. If the input device is determined by the control unit to be moving towards the screen at a speed above a predetermined threshold, the proximity zoom functionality may not be activated. The speed threshold may be user selectable.

Figure 7:
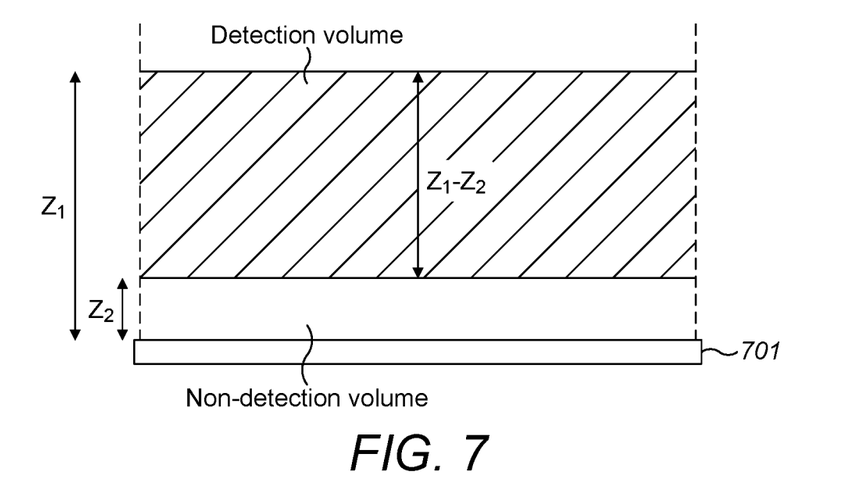
FIG. 7 shows a proximity detection volume used to control zooming of a display in relation to a touch screen.

In addition to, or instead of, a time delay or speed threshold to determine activation of the proximity zoom function, the proximity detection system may be configured to provide an altered proximity detection volume of the sort shown in FIG. 7. As with FIG. 5, FIG. 7 shows a side view of a mobile phone having a touch screen 701 which again may or may not include a protective cover. As with FIG. 5, the detection volume begins at a distance $Z_1$ from the screen, such as 2-5 cm from the screen, for example. In addition, the detection volume of the proximity detection system of FIG. 7 ends at a distance $Z_2$ from the screen, $Z_2$ being a shorter distance than $Z_1$ and for example 0.3-2 cm from the screen and preferably 0.5 cm-1 cm from the screen. A user input device located within a distance $Z_2$ of the screen 701 will not cause the zoom function to activate and will not change or effect the content output on the display. This has the advantage that when the user is using the touch screen functionality for successive input to the touch screen by the user input device the proximity zoom functionality will not activate, provided the user input device does not leave the non-detection volume extending the distance $Z_2$ from the screen.

To implement the non-detection volume the proximity detection arrangement could be configured such that no detection takes place within the desired volume, for example by having no sensors covering that volume. However, in embodiments such as those implemented within a continuously variable detector such as a capacitive proximity detector, it would be more desirable to configure the control unit/processor to ignore detections made in the non-detection volume. The non-detection volume is located adjacent to the touch screen and allows tasks requiring repeated touch screen inputs to be undertaken without activating the zoom functionality. For example, if the user is entering longs streams of text and does not want the zoom mode to be enabled.

Figure 8:
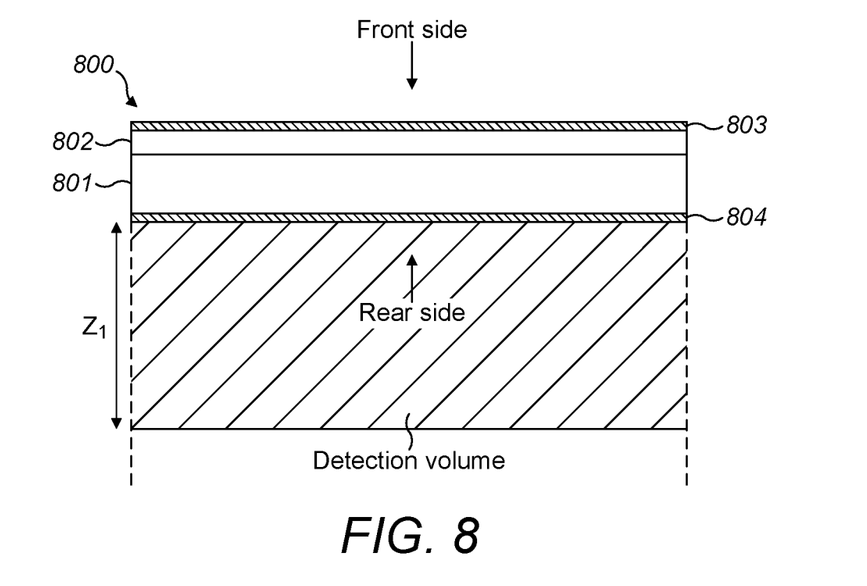
FIG. 8 shows an alternative embodiment of the invention in which the proximity sensor is located on the opposite side of the device to the display screen.

A further embodiment of the invention is shown in FIG. 8, which includes a side view of the user device 800 having a main body 801 and a touch screen display 802, preferably with a protective coating or layer 803, as may be the case with previous embodiments described above. Also in common with the previous embodiments is the provision of a proximity detector arrangement 804. Rather than the proximity detector arrangement being configured to detect the location of an input device relative to the touch screen display on the side of the user device adjacent to the touch screen, the proximity detector arrangement is configured to detect the location of an input device on the side of the device opposite the side featuring the touch screen. In the same manner described above, the proximity detector arrangement determines the position of an input device relative to the display, detecting a position of the input device that can be used to determine a value indicative of the distance of the input device to the display.

In this way, the user can control the zoom or enlargement of an area of the screen by an input device on the underside of the device, but the touch sensitive screen is located on the upper side of the device. Such an arrangement is particularly applicable to mobile phones, smart phones or tablets that are generally relatively thin and are approximately shaped as a thin cuboid having two opposite sides of a large surface area and two further pairs of opposite sides having comparatively smaller surface areas.

Embodiments of the sort shown in FIG. 8 allow the user to employ touch screen functionality and to separately employ proximity detection functionality by manipulating an input device in an input volume located on the opposite side of the device to the touch screen. In particular, the user may grip the user device in one hand, and manipulate the touch screen with the other hand, whilst utilising the zoom functionality with a finger of the same hand being used to hold the device.

The proximity sensor on the rear of the device may be configured purely to detect a distance along the z axis, that is a distance along a line perpendicular to the plane of the touch screen, or to the sensor itself. The device may be configured to allow the user to select a region of the display to zoom/expand via input on the touch screen such as by highlighting an area or "clicking" a region of the screen. However, preferably as with previous embodiments the proximity detector arrangement 804 is configured to detect the position of the input device in three dimensions, being the direction in the z axis perpendicular to the plane of the screen, and a location in the x,y plane of the screen. Thus the user has control, by manipulating an input device within the detection volume adjacent to the rear side of the device, to select a region of the screen by position in the input device in a particular x,y coordinate relative to the screen and at a particular z coordinate relative to the screen.

Where the proximity detector is located on the rear of the device, any of the features described in relation to other embodiments may equally be applied to the proximity detector.

Figure 9A:
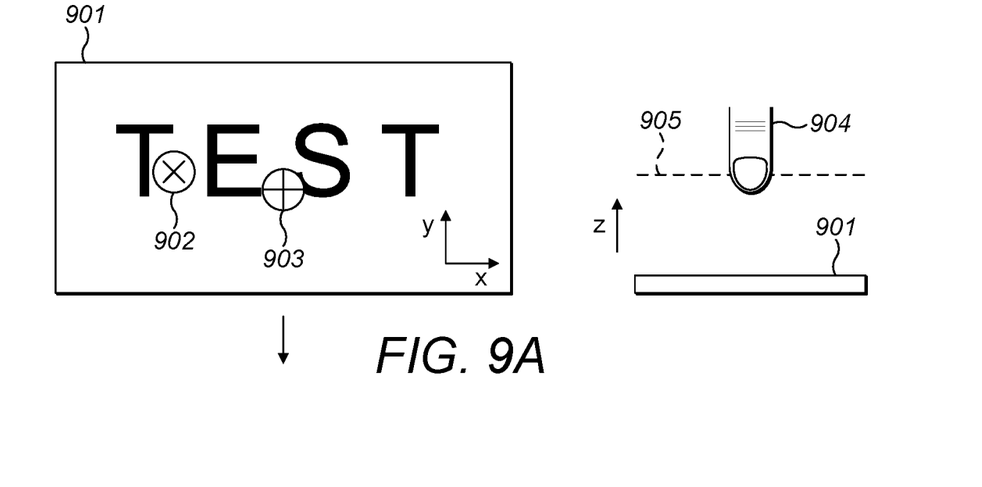
FIGS. 9A-C show an example of how zooming of a display may be enacted using proximity detection.
Figure 9B:
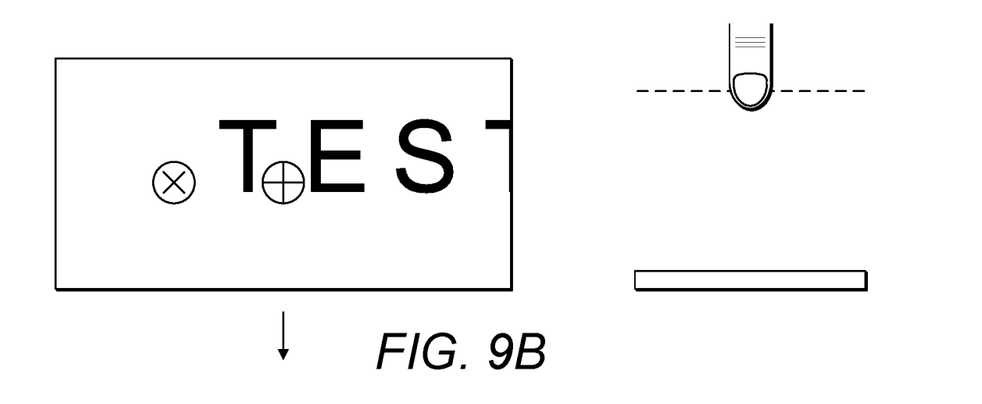
Figure 9C:
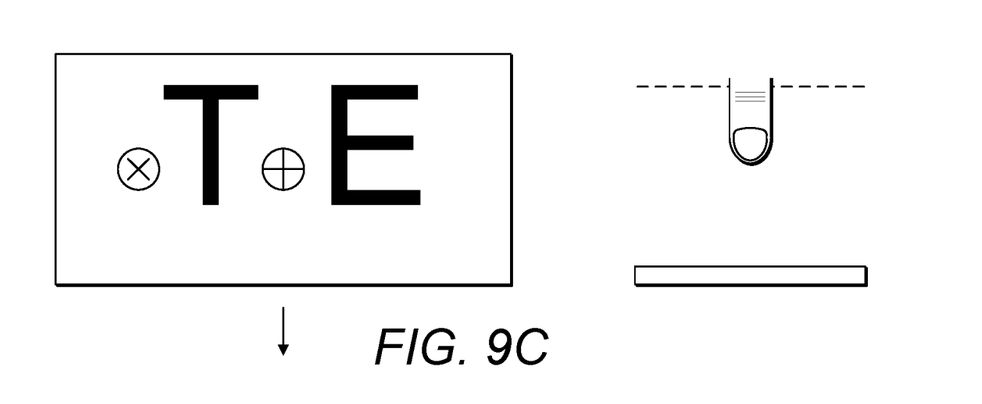

As mentioned above, the manner in which the zoom function is achieved on the display can vary depending on context. For example, the control unit may detect the location of the input device relative to the plane of the display screen and as the distance of the input device to the screen is varied the entirety of the display is enlarged or reduced around that location in the plane of the screen. In other words, the x,y co-ordinate of the user input device is determined and this serves as the centre around which the zoom function occurs. The control unit may therefore control the screen to centre the screen around the x,y co-ordinate of the input device within the detection volume. This is illustrated in FIGS. 9A-C which show three successive top down images of a screen 901 having a central portion 903. The x,y co-ordinate of the user input device 904 is shown at portion 902. To the right of each image of the screen is shown a diagram showing the side-on view of the screen 901 giving an indication of the positioning along the z axis of the user input device 904. In the first image of the series, image A, the user input device enters the detection volume defined by perimeter 905 having an x,y co-ordinate as identified at region 902. Moving onto image B it will be noted that the user input device has not yet moved in the z axis. The control unit first re-centres the image on the screen such that the portion previously identified by the x,y co-ordinate of the user interface device is moved to the centre. Moving on to image C the user input device moves closer to the screen resulting in a magnification of the desired portion. The user does not need to move the input device in the x,y co-ordinate, and as a result the region being enlarged is not obscured by the input device. This allows the user to read the enlarged portion of the displayed image.

As an alternative to the arrangement in FIG. 9 the determination of an x,y co-ordinate for the user input device as it enters the detection volume could trigger the opening of a window displaying the content centred around the determined x,y co-ordinate of the input device. This window may be displaced from the x,y co-ordinate of the input device relative to the screen such that the input device does not obscure the content. As the user input device moves closer to the screen, the image within the pop-up window is enlarged, centering around the x,y co-ordinate of the user input device. This method could be used for enlarging a keypad for entering data, such as text data for example.

Figure 10A:
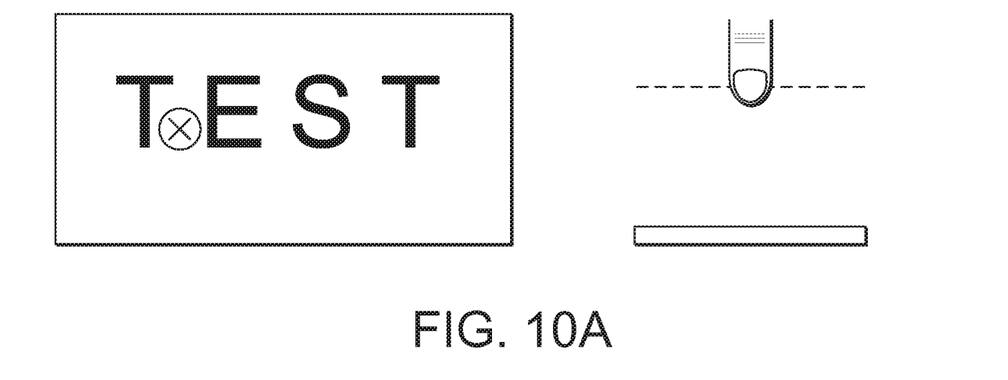
FIGS. 10A-C show a further example of how zooming of a display may be enacted using proximity detection.
Figure 10B:
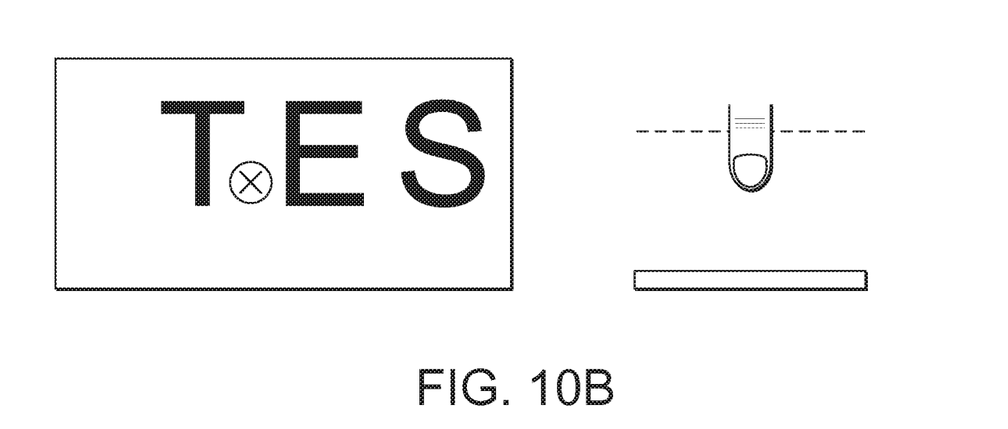
Figure 10C:
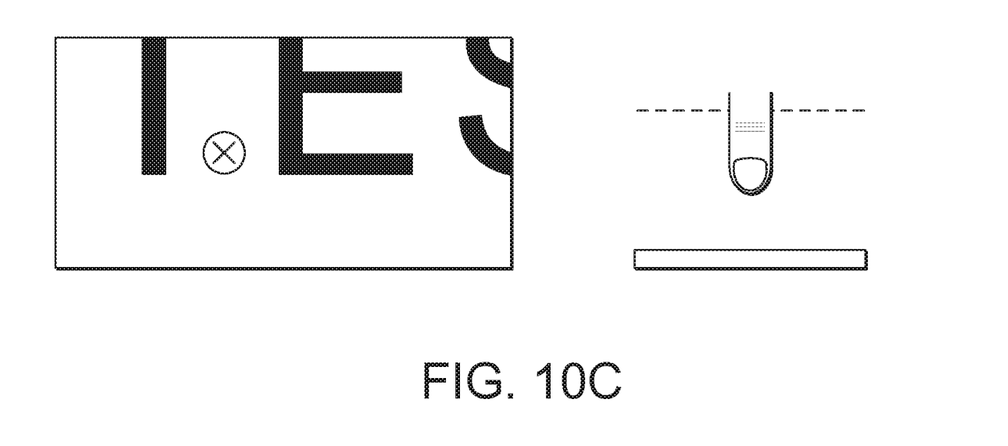

An alternative arrangement could be that shown in FIGS. 10A-C whereby as the input device moves closer to the screen the zoom is focussed around the x,y co-ordinate of the input device.

The control unit may be configured to zoom in as the input device approaches the screen and to zoom out as the input device recedes from the screen. In this way the user can dynamically control the zoom by moving the input device closer to or further from the screen within the input volume. However, it may be preferable to be able to maintain a particular zoom level without maintaining the input device within the input volume. To accommodate this, the control unit may be configured to zoom or enlarge the image on the screen as the input device approaches the screen, but to take no action as the input device recedes from the screen. In this way, the user can zoom to a desired level and maintain the zoom while withdrawing the input device from the input volume. In order to revert to the original sized un-zoomed view an additional input may be provided to the control unit. This may be in the form of any other type of input, but may include reinserting the input device into the detection volume, and preferably reinserting the input device into the detection volume for a predetermined period of time.

Other manners of controlling the zoom are possible. The zoom may be cancelled, the content on the screen being reverted to normal size, if the input object/device is removed from the input volume. The zoom may be maintained if the touch screen is subsequently touched by the input device. For embodiments such as that described in relation to FIG. 7, featuring a non-detection volume, the zoom may be maintained as the input device passes within the distance $Z_2$ of the display screen such that maximum zoom is maintained whilst the user utilises the touch screen functionality.

Multiple zoom actions may be used according to the following method. The user inserts the input device into the detection volume and as the input device moves closer to the screen the level of zoom is increased as discussed above. Once the user reaches the zoom limit allowed by movement within the detection volume, either by moving the input device to touch the screen, or moving the input device into the non-detection volume and then removes the input device from the input volume a subsequent re-entry of the input device into the detection volume may cause further zooming. The zooming could be aborted by inserting the input device into the detection volume for a predetermined period of time, preferably holding the input device comparatively still, and withdrawing it, otherwise the level of zoom increases subsequently as the input device moves closer to the display screen for a second time.

In some embodiments the zoom functionality may be deactivated when touch screen functionality is being employed by the user.

The implementations of the zoom functionality described above may be incorporated in any touch screen device featuring proximity detection of the type described herein.

The general discussion above has focused on determining the distance of an input device to a touch sensitive display. It should be understood that this is a relative consideration, since the calculation performed by the control unit may not directly calculate the distance. For example, the distance to the plurality of sensors in the proximity detector arrangement may be the value actually calculated since the position of the screen relative to these sensors will be fixed, and such a distance value is still indicative of the distance between the input device and the screen.

By way of clarification, the user devices to which embodiments of the invention may be described include any device that incorporates a touch sensitive screen. In particular this may include mobile terminals and communication devices such as mobile phones, smartphones, tablets, laptops, personal digital assistants (PDAs) and so forth. Embodiments may also be applied to other types of user devices incorporating touch sensitive displays such as set top boxes for receiving and decoding media content for display, GPS devices, televisions, or other types of home appliance.

It will be understood that features of the user device described herein may be combined with one of more of the other described features in a single user device.

What is claimed is:

1. A user device comprising:
a touch screen display having a touch screen input;
a proximity detector arrangement comprising a plurality of sensors for detecting a location of an input device by:
   detecting a capacitance change due to a change in a distance between the input device and the touch screen display, wherein the proximity detector arrangement is triggered to detect the capacitance change based upon a distance between the input device and the plurality of sensors; and
   producing a voltage change based on the detected capacitance change, the voltage change being linearly related to the distance between the input device and the plurality of sensors;
a control unit comprising a processor, the control unit being configured to:
   when the proximity detector detects that the capacitance change reaches a touch detection threshold, the control unit activating a zoom function of the touch screen display; and
   while the zoom function of the touch screen display is activated, the control unit increasing a level of zoom in response to movement of the input device toward the plurality of sensors, by:
      receiving data from the proximity detector to determine the movement of the input device toward the plurality of sensors, wherein the data comprises the voltage change; and
      controlling the display to perform the zoom function to enlarge the size of content on a portion of the display based on the voltage change so that the size of content on the display is enlarged from an initial size as the input device moves closer to the display and maintained as the enlarged size as the input device subsequently moves further from the plurality of sensors, the control unit being further configured to resize the content to the initial size in response to a further input on the user device;
wherein the proximity detector arrangement and control unit are configured to detect the change in the distance between the input device and the plurality of sensors within a detection volume and to provide a gradual variation in enlargement of the size of content as the distance from the input device to the display varies.

2. A user device according to claim 1 wherein the control unit is configured to wait for a predetermined time period between detecting a change in position of the input device within the detection volume and performing the zoom function.

3. A user device according to claim 2 wherein the control unit is configured to calculate an average coordinate position of the input device during the predetermined time period, the processor being further configured to ignore movements of the input device within a predetermined distance of the calculated average position such that they have no effect on the zoom function.

4. A user device according to claim 1, wherein the control unit is configured to wait for a predetermined time period between detecting the entrance of the input device into the detection volume and performing the zoom function.

5. A user device according to claim 4 wherein the detection volume extends a predetermined first distance from the display and wherein the detection volume excludes a volume extending a second predetermined distance from the display, the first distance being greater than the second distance.

6. A user device according to claim 5 wherein the control unit is configured to ignore any measurements performed within the excluded volume.

7. A user device according to claim 6 wherein the touch screen input and the proximity detector arrangement are the same components.

8. A user device according to claims 1 wherein the touch screen display is located on a first side of the user device and wherein the proximity detector arrangement is located on a second side of the user device, the second side being an opposite side to the first side.

9. A user device according to claim 1 wherein the control unit is configured to detect when the input device exits and re-enters the detection volume such that a re-entry of the input device into the detection volume causes further zooming whereby the level of zoom further increases as the input device moves closer to the display.

10. A user device according to claim 1 wherein the further input is re-entry of the input device into the detection volume for a predetermined period of time.

11. A user device according to claim 10 wherein the control unit is configured to commence detection of the distance of the input device at a first predetermined distance and to stop detection of the distance of the input device at a second predetermined distance, the first distance being different to the second distance.

12. A user device according to claim 11 wherein the plurality of sensors of the proximity detector arrangement are capacitive sensors.

13. A method executable by a user device for controlling a zoom function, the user device comprising a touch screen display having a touch screen input and a proximity detector arrangement comprising a plurality of sensors for detecting a location of an input device, the method comprising:
    detecting a capacitance change at the proximity detector due to a change in a distance between the input device and the touch screen display, wherein the proximity detector is triggered to detect the capacitance change occurring when the input device reaches a touch detection threshold comprising a predetermined distance to the plurality of sensors;
    producing a voltage change based on the detected capacitance change, the voltage change corresponding to the distance between the input device and the plurality of sensors; and
    when the proximity detector detects the capacitance change occurring when the input device reaches the touch detection threshold, activating a zoom function of the touch screen display; and
    as the input device moves closer to the touch screen display while the zoom function is activated, increasing a level of zoom, by:
        determining the distance between the input device and the plurality of sensors within a detection volume based on the voltage change; and
        controlling the display to perform the zoom function to enlarge the size of content on a portion of the display based on the voltage change by gradually varying the enlargement or reduction of the size of content as the distance from the input device to the plurality of sensors varies so that the size of content on the display is enlarged from an initial size as the input device moves closer to the plurality of sensors and maintained as the enlarged size as the input device subsequently moves further from the plurality of sensors, the control unit being further configured to resize the content to the initial size in response to a further input on the user device.

14. A method according to claim 13 further comprising waiting for a predetermined time period between detecting a change in position of the input device within the detection volume and controlling the display to perform the zoom function.

15. A method according to claim 14 further comprising calculating an average coordinate position of the input device during the predetermined time period, the processor being further configured to ignore movements of the input device within a predetermined distance of the calculated average coordinate position so that such movements have no effect on the zoom function.

16. The method according to claim 13 further comprising detecting when the input device exits and re-enters the detection volume such that a re-entry of the input device into the detection volume causes further zooming whereby the level of zoom further increases as the input device moves closer to the display.

* * * * *